(No Model.)
G. SOBOTKA.
PROCESS OF SEPARATING AND ASSORTING YEAST.
No. 471,688. Patented Mar. 29, 1892.
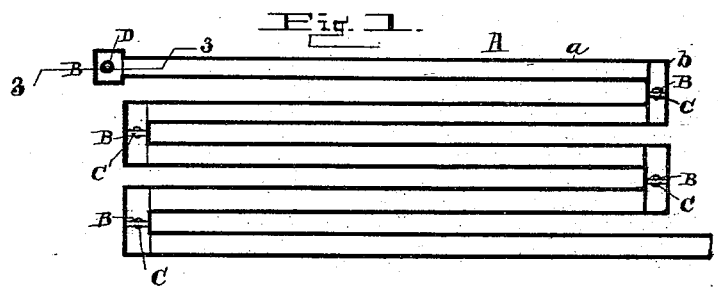
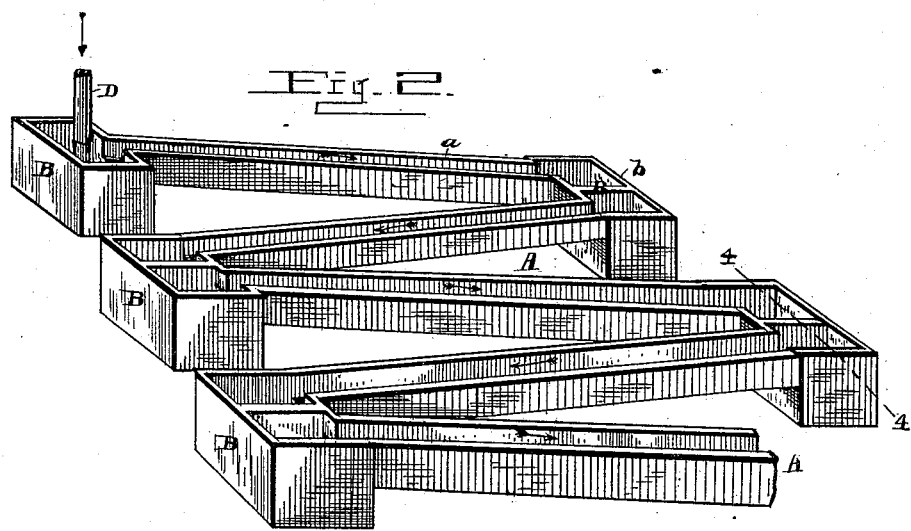
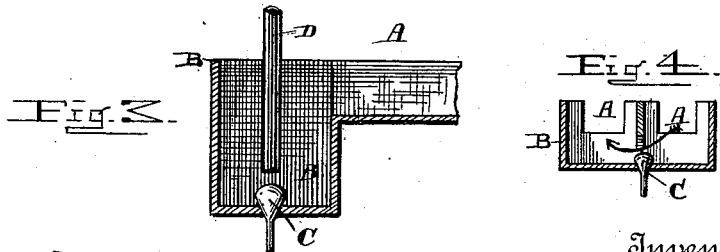
Witnesses
Arthur E. Dowell
Jas. R. Mansfield
Inventor
Gustav Sobotka
By Butterworth & Dowell
his attorneys

UNITED STATES PATENT OFFICE.

GUSTAV SOBOTKA, OF NEW YORK, N. Y., ASSIGNOR TO FLEISCHMANN & CO., OF SAME PLACE.

PROCESS OF SEPARATING AND ASSORTING YEAST.

SPECIFICATION forming part of Letters Patent No. 471,688, dated March 29, 1892.

Application filed October 17, 1890. Serial No. 368,467. (No specimens.)

*To all whom it may concern:*

Be it known that I, GUSTAV SOBOTKA, a subject of the Emperor of Austria-Hungary, and a resident of the city of New York, in the county and State of New York, have invented certain new and useful Improvements in Processes for Separating and Assorting Yeast, of which the following is a specification.

This invention relates to improvements in the method or process of separating yeast; and the object of the invention is to provide an improved method of separating the yeast from the fermented wort or beer resulting from a clear wort and grading it according to its quality.

To this end my invention consists in an improved method of separating and assorting yeast by causing the fermented wort or beer to flow slowly and smoothly along or through a suitable trough or chute having pockets or depressions at intervals in its length, preferably at the bends of a serpentine trough or slightly-inclined surface, so as to interrupt and retard the flow of the liquid at the points where the pockets are placed or the direction of the flow reversed, thereby causing the yeast-cells to be deposited and settle in different grades in the several sections or divisions of the trough, the heavier cells being deposited in the first section or sections and the cells of less specific gravity being deposited in succeeding sections, the clear residual beer or liquid being finally run off from the yeast and the assorted yeast removed from the several sections or divisions, according to their grades.

In the accompanying drawings, representing one form of apparatus which may be used in practicing my invention, Figure 1 is a plan of the apparatus. Fig. 2 is a perspective view of the apparatus on a slightly-enlarged scale. Fig. 3 is a detail sectional view taken on the line 3 3 of Fig. 1, and Fig. 4 is a detail sectional view taken on the line 4 4 of Fig. 2.

Similar letters of reference are used to indicate corresponding parts in each of the figures.

The chute or trough A is preferably serpentine in form, and is arranged horizontally or slightly inclined and provided at each bend with a pocket or depression B, in the bottom of which an aperture is provided which can be closed by a suitable stopper C. The inlet-pipe D extends to near the bottom of the first pocket B, as shown clearly in Fig. 3. The beer or wort which contains the yeast enters the first pocket through the pipe D, extending nearly to the bottom, as shown, so as to cause the liquid to flow very slowly into the serpentine chute or trough, and I preferably provide the trough at the end of each section or bend therein with a partition or wall extending nearly to the bottom of the pocket, as shown clearly in Fig. 4, so as to facilitate the breaking up of the current and the deposit of the yeast. As the liquid runs along the serpentine chute the specifically lighter matters—coagulated albumen, &c.—will be carried along by the current and pass out at the end of the chute or inclined surface with the clear residual liquid or beer, while the yeast, which has greater specific gravity, is deposited and settles in the several sections or divisions of the surface.

As different qualities of yeast result from the fermentation of mash and the larger and well-developed cells are heavier, the yeast is automatically assorted according to its qualities, the yeast which settles in the first section being of the first quality and the qualities decreasing in the sections toward the end of the chute.

The fermented wort entering the trough near the bottom of the pocket in the first section $a$ flows slowly and smoothly down the slightly-inclined surface until it reaches the bend $b$, at which point the flow of the liquid will be interrupted and retarded and the current broken, thus facilitating the deposit of the yeast in and about the trough and pocket, and this operation will be repeated at each successive section, thus causing the heavier cells to be deposited in the foremost sections or divisions and the cells of less specific gravity in the succeeding sections to the end of the operation. By this means the yeast will be thoroughly separated and also assorted into different grades, while the clear residual beer or liquid may be run off at the end of the trough. This operation being completed, the contents of each section may be emptied through the opening in the bottom of the pocket at the lowermost end of such section.

It will be understood, of course, that this method of separating and assorting yeast may be carried into effect without employing a serpentine trough; but for the purpose of producing the best results and as a means of economizing space I preferably use an apparatus of the described construction.

Having thus fully described my invention, what I claim, and desire to secure by Letters Patent of the United States, is—

The herein-described process of separating and assorting yeast, which consists in running the fermented wort slowly and smoothly along a chute or trough adapted to interrupt and retard the flow of the liquid at intervals, so as to cause the yeast cells or spores to be deposited and settle in different grades in successive sections or divisions of the trough, the heavier cells being deposited in the first section or sections and the cells of less specific gravity being deposited in succeeding sections, running off the clear liquid or beer from the yeast which settles in the trough, and finally removing the assorted yeast from the several sections or divisions, according to their grades, substantially as described.

In testimony that I claim the foregoing as my invention I have signed my name in presence of two subscribing witnesses.

GUSTAV SOBOTKA.

Witnesses:
OSCAR F. GUNZ,
MARTIN PETRY.